(12) United States Patent
Gregov et al.

(10) Patent No.: US 7,930,218 B1
(45) Date of Patent: *Apr. 19, 2011

(54) PERSONALIZED PROMOTION OF NEW CONTENT

(75) Inventors: Andrej Gregov, Seattle, WA (US); Greg Linden, Seattle, WA (US); Josh Petersen, Seattle, WA (US); Brent Smith, Redmond, WA (US); Jeremy Charles York, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/056,125

(22) Filed: Mar. 26, 2008

Related U.S. Application Data

(62) Division of application No. 09/848,608, filed on May 3, 2001, now Pat. No. 7,376,588.

(60) Provisional application No. 60/272,397, filed on Feb. 28, 2001.

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 5,021,953 A | 6/1991 | Webber et al. | |
| 5,794,253 A | 8/1998 | Norin et al. | |
| 5,848,396 A | 12/1998 | Gerace | |
| 5,948,040 A | 9/1999 | DeLorme et al. | |
| 6,064,980 A * | 5/2000 | Jacobi et al. | 705/26 |
| 6,266,649 B1 | 7/2001 | Linden et al. | |
| 6,606,744 B1 | 8/2003 | Mikurak | |
| 6,647,417 B1 | 11/2003 | Hunter et al. | |
| 7,092,892 B1 | 8/2006 | Sobalvarro et al. | |
| 2001/0054015 A1 | 12/2001 | Boucousis | |

OTHER PUBLICATIONS

Kambil, A., and M. Ginsburg, "Public Access Web Information Systems: Lessons From the Internet EDGAR Project," Communications of the ACM 41:7:91-97, Jul. 1998.

* cited by examiner

*Primary Examiner* — Naeem Haq
(74) *Attorney, Agent, or Firm* — Knobbe, Martens, Olson & Bear LLP (57) ABSTRACT

A facility for presenting information about new items, such as new items available via a web site is described. The facility receives a request for information submitted on behalf of an identified user. In processing the request, the facility accesses a set of items having effective times. The facility performs a first filtering process to eliminate items of the set whose effective times indicate that the items are not new. The facility performs a second filtering process to eliminate items of the set in which the user likely has a low level of interest. Subsequent to both the first and second filterings, the facility presents to the user information about each of at least a portion of the filtered items.

25 Claims, 9 Drawing Sheets

Amazon.com Articles and Essentials - Microsoft Internet Explorer provided by Perkins Coie LLP

File  Edit  View  Favorites  Tools  Help

Address: http://www.amazon.com/exec/obidos/subst/recs/new-for-you/articles-and-essentials-main.html/ref=pd_nfy_hp_a/102-9145977-7780918

NEW FOR YOU
- Home Page
- New Releases
  - Books
  - Music
  - DVD
  - Video
  - Toys & Games
  - Electronics
  - Software
  - Computer & Video Games ⎫ 711
- Articles and Essentials ⎬ 710

More to Explore
- Recommendations
- Movers & Shakers
- The Page You Made
- Friends & Favorites

New for You E-mail
The newest

New for You
Articles & Essentials

Hello, steve lawrenz. Discover what's new for you in articles, interviews and more. (If you're not steve lawrenz, click here.)

In Articles

Steely Dan: Reelin' in the Years
From 1972's *Can't Buy a Thrill* through year 2000's *Two Against Nature*, Steely Dan has matched sophisticated pop craft with sinister wit, in the process pulling off the neat trick of being both widely misunderstood and commercially commanding. Amazon.com contributor Jerry McCulley explores the ongoing achievements forged by the enigmatic partnership of Walter Becker and Donald Fagen. ⎱ 721

▸ Read Amazon.com's article

More Articles
- Naked Guns and Hot Shots: The Comedy of Z-A-Z — 712
- David Pogue's Reading List — 713

In Interviews

The Great (Smashing) Pumpkin: Billy Corgan
Billy Corgan and the Smashing Pumpkins return with a reconstituted lineup and a newfound passion for amped-up, unadulterated rock & roll on their fire-breathing new record, *Machina: The Machines of God*. Amazon.com's Matthew Cooke spoke with Corgan about his approach to the new record, its resemblance--or lack thereof--to past triumphs, and what it is like, finally, to feel respected. ⎱ 720

▸ Read Amazon.com's interview

More Interviews
- Earthquake Weather — 722

PERSONALIZED PROMOTION OF NEW CONTENT

CROSS REFERENCE TO RELATED APPLICATIONS

This is a divisional application of U.S. patent application Ser. No. 09/848,608, entitled PERSONALIZED PROMOTION OF NEW CONTENT, filed on May 3, 2001 now U.S. Pat. No. 7,376,588, which claims the benefit of U.S. Provisional Application No. 60/272,397 filed Feb. 28, 2001, each of which is hereby incorporated by reference.

TECHNICAL FIELD

The present invention is directed to the field of web site design, and, more particularly, to the field of page view maximization.

BACKGROUND

Traffic to a web site is typically measured in "page views"—the number of requests received for web pages of the web site. The operator of a web site generally benefits from increases in the number of page views occurring at the web site. If a larger number of page views occurs at a web merchant web site, it is then often possible to sell more products or services. For a web site supported by advertising, a larger number of page views typically provides an opportunity to present a larger quantity of advertising, yielding greater advertising revenue. When a greater number of page views occurs at a web site that exists primarily to disseminate information, such as information relating to a social cause, more information can be disseminated about the cause. Accordingly, the operators of web sites have a significant incentive to develop and implement strategies for increasing the number of page views occurring at their web sites.

One such strategy employed by web merchant sites is to, on a web page of the web site directed to a particular product category, list the newest products available in the category. While this approach sometimes succeeds in increasing page views by drawing the attention of users to products they have not yet seen, it has a number of disadvantages.

First, for a web merchant having many product categories, a user is required to traverse to a large number of product category web pages in order to find out about all of the new products. This can often be a painstaking process, and therefore one completed by few users. Even after the user has done so, however, it can be difficult for the user to remember new products in earlier-reviewed categories.

Second, on a particular product category web page, the same list of new products is generally displayed to all users. Accordingly, for a particular user, the list of new products may include products that the user has previously seen on the new product list, omit new products that the user has not yet seen on the new product list, include products in which the user is not interested, or exclude new products in which the user is interested.

Third, the strategy is effective only to promote new products, as opposed to any other aspects of the web site.

In view of the shortcomings discussed above, an approach to promoting new web site content that better maximizes the potential to increase page views at the web site would have significant utility.

BRIEF DESCRIPTION OF THE DRAWINGS

FIG. 2 is a display diagram showing an abbreviated display of new items.

DETAILED DESCRIPTION

A software facility for presenting information on new products likely to be of interest to a user is described. In many embodiments, the facility incorporates information about various types and categories of new items in a central location, enabling the user to quickly and easily identify new items appearing throughout the web site. Items may include, for example, products; services; various kinds of content, such as reviews, interviews, and announcements; and combinations thereof. The facility is particularly well-suited to use by or on behalf of merchants, such as web merchants. The facility may be used to present information via the web, or in a variety of other ways, including electronic mail and various other kinds of messaging.

The facility typically operates by filtering available items both based upon their effective date—thereby identifying items that are new—and based upon the likelihood that the user will be interested in the items. Both kinds of filtering may be performed in a variety of different ways. For example, date filtering may be performed based upon the current date, dates of previous visits to the web site, or a combination thereof. Date filtering may be applied to a variety of types of effective dates attributed to items. In some embodiments, items selected through this filtering process for presentation are also ordered based upon a likelihood that they will be of interest to the user. Interest filtering may be performed based upon preferences attributable directly to the individual user, those attributable to a group of which the user is a member, and/or those attributable to all users. User interests may relate to, for example, genre, author, artist, and other category areas of interest as determined from a customer's previous purchases, previous ratings, or expressed explicitly. Interest filtering may use information about item sales or other forms of consumption, web browsing behavior, and other indications of interest. Recommendation engines that produce for a user a list of products, genres, authors, or other items recommended for the user—such as the recommendation engine described in U.S. patent application Ser. No. 09/157,198, which is hereby incorporated by reference in its entirety—may also be utilized in the interest filtering process. In some embodiments, the facility also sorts items selected for presentation based upon the likelihood that they will be of interest to the user.

Figure 1:
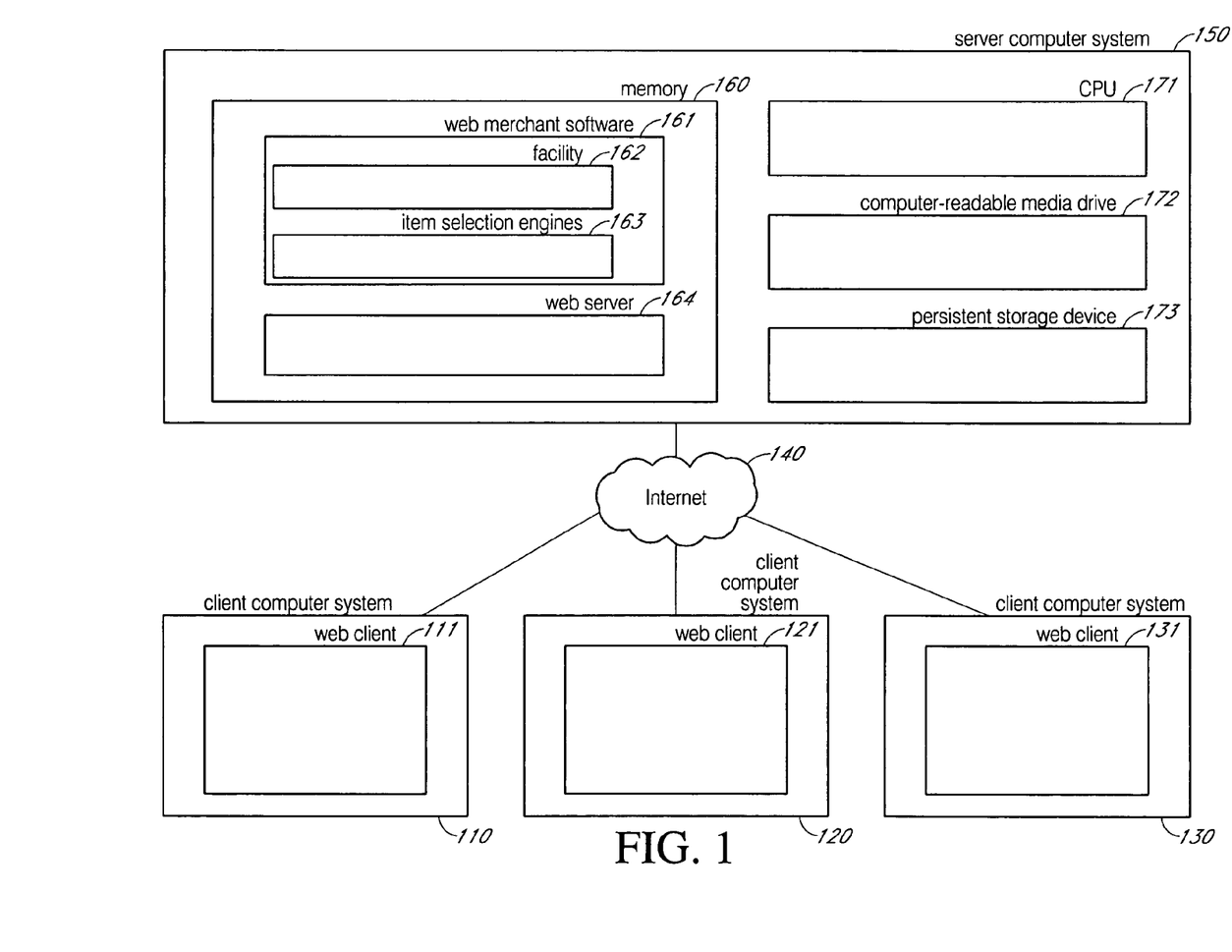
FIG. 1 is a high-level block diagram showing a typical environment in which the facility operates.

By presenting information in this way, the facility generally increases the amount of time that users spend visiting a merchant web site, increases sales, increases the user's level of interest in and affinity for a merchant web site, and/or increases advertising opportunities. FIG. 1 is a high-level block diagram showing a typical environment in which the facility operates. The block diagram shows several client computer systems, such as client computer systems 110, 120, and 130. Each of the is client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains web merchant software 161 incorporating both the facility 162 and an item selection engine 163 preferably used by the facility. The memory preferably further contains a web server computer program 164 for delivering web pages in response to requests from web clients. While items 161-164 are preferably stored in memory while being used, those skilled in the art will appreciate that these items, or portions of them, may be be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While various embodiments are described in terms in the environment described above, those skilled in the art will appreciate that the facility may be implemented in a variety of other environments including a single, monolithic computer system, as well as various other combinations of computer systems or similar devices connected in various ways.

FIGS. 2-8 are display diagrams showing typical displays generated by the facility in aspects of its operation. While these Figures depict the facility's output as a collection of web pages, various embodiments of the facility present information to users in various different forms, including but not limited to electronic mail messages, instant messages, and pager messages, as well as physical messages.

FIG. 2 is a display diagram showing an abbreviated display of new items. The abbreviated display of new items 210 is shown as a section entitled "New for You" that is included in a central web page 200 of a merchant web site, such as the home page that is displayed when a URL containing a hostname for the merchant web site but no pathname. The abbreviated display may also be included on a variety of different web pages within the merchant web site, or, indeed, on web pages of other related web sites. In some embodiments, an HTML document embodying the display may be delivered via electronic mail or in another manner.

The abbreviated display 210 contains a name 211 associated with the user (identified using a cookie, a login process, or a similar mechanism), as well as a link 213 that the user can follow if the user has been misidentified. The abbreviated displayed also includes a link 212 that the user can follow to a more extensive displayed of information about new items. The abbreviated display further includes a "New Releases" section containing links for categories of new products, as well as a link to a more extensive display of information about new products. In some embodiments, the product categories shown are selected and sorted based upon information about preferences of the user, such as sales information, browsing information, etc.

The abbreviated display also contains a "Movers & Shakers" section 215 listing products whose sales rates have recently accelerated dramatically. In various embodiments, this abbreviated display may contain various additional information, including portions of any other information described or depicted herein.

Figure 3:
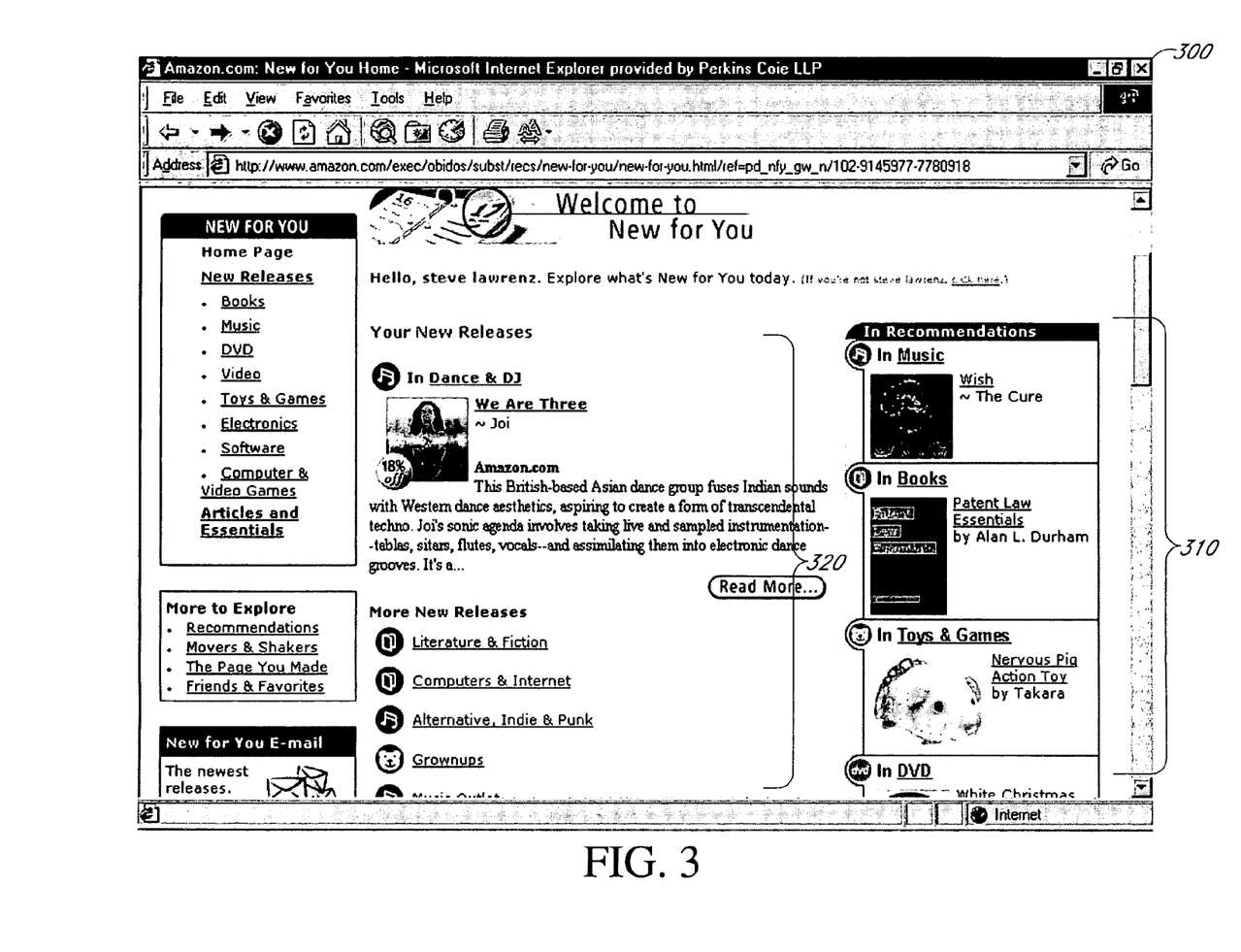
FIG. 3 shows a first page of this more extensive display.

FIGS. 3-7 show a more extensive display of new items. In some embodiments, this display is presented when the user clicks on a new items link, such as link 212 shown in FIG. 2. FIG. 3 shows a first page of this more extensive display. This display 300 contains a list 310 of recommended items. Each item in this list includes associated information, such as the name of the recommended product, a to source of the product, such as a musical artist, an author, or manufacturer, and a pictorial representation of the product. The user may preferably click on certain of these pieces of information to view a more detailed recommendation of the product. Each item also includes an indication of the category containing the recommended product, which the user may click on in order to view additional recommendations in that category. The display 300 further contains information 320 about new products that is customized to the user. For example, information 320 includes information about a new musical album in the "Dance & DJ" category in which the facility determines the user may be interested. Information 320 also includes links to lists of new products in a variety of other categories.

Figure 4:
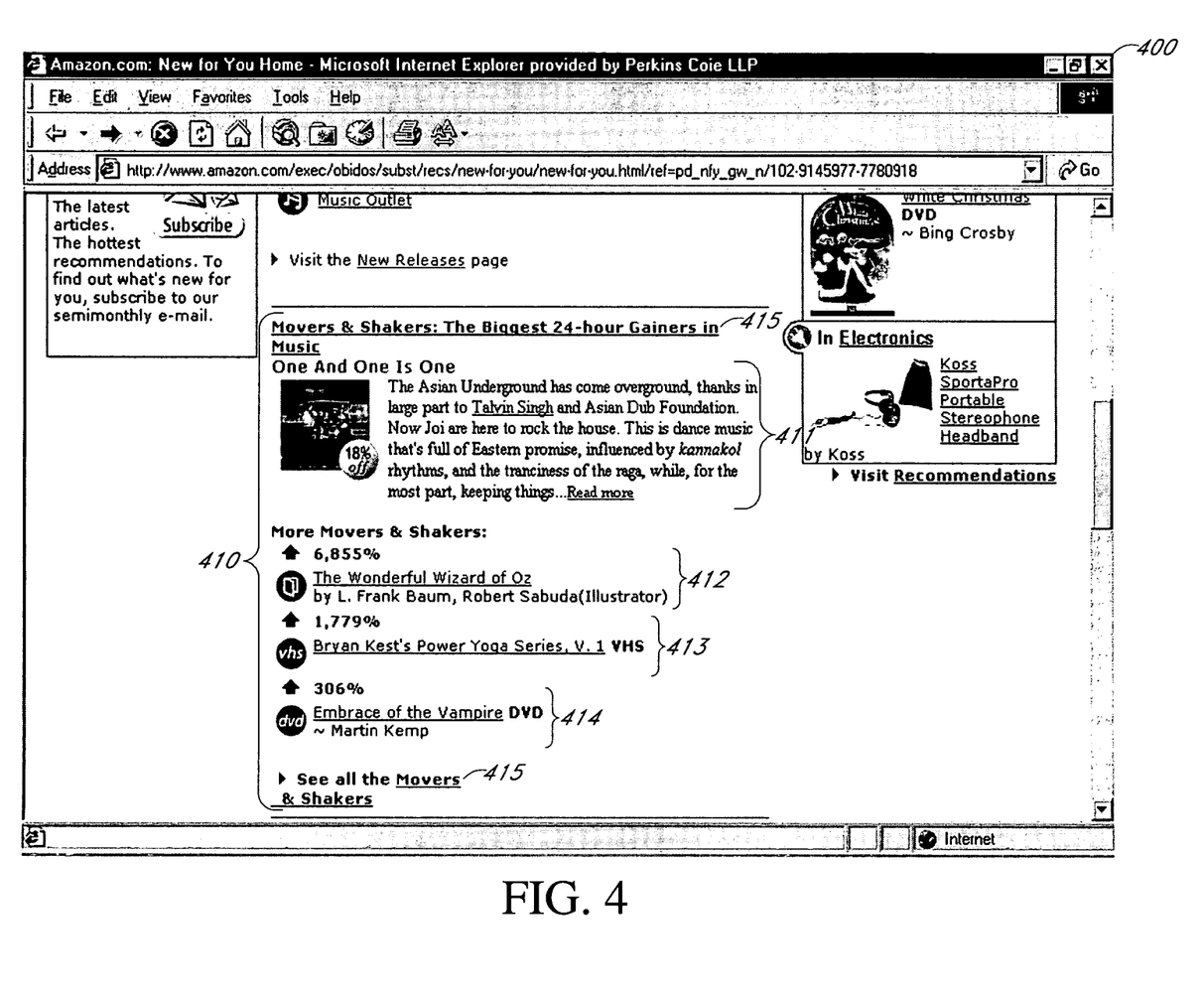
FIG. 4 shows a second page of the more extensive display.

FIG. 4 shows a second page of the more extensive display. Page 400 includes a section 410 called "Movers & Shakers" that shows products whose sales rate is undergoing the greatest acceleration. Section 410 includes a link 415 to more extensive Movers & Shakers information, detailed information 411 about one leading Mover & Shaker, and additional information 412-414 about other Movers & Shakers.

Figure 5:
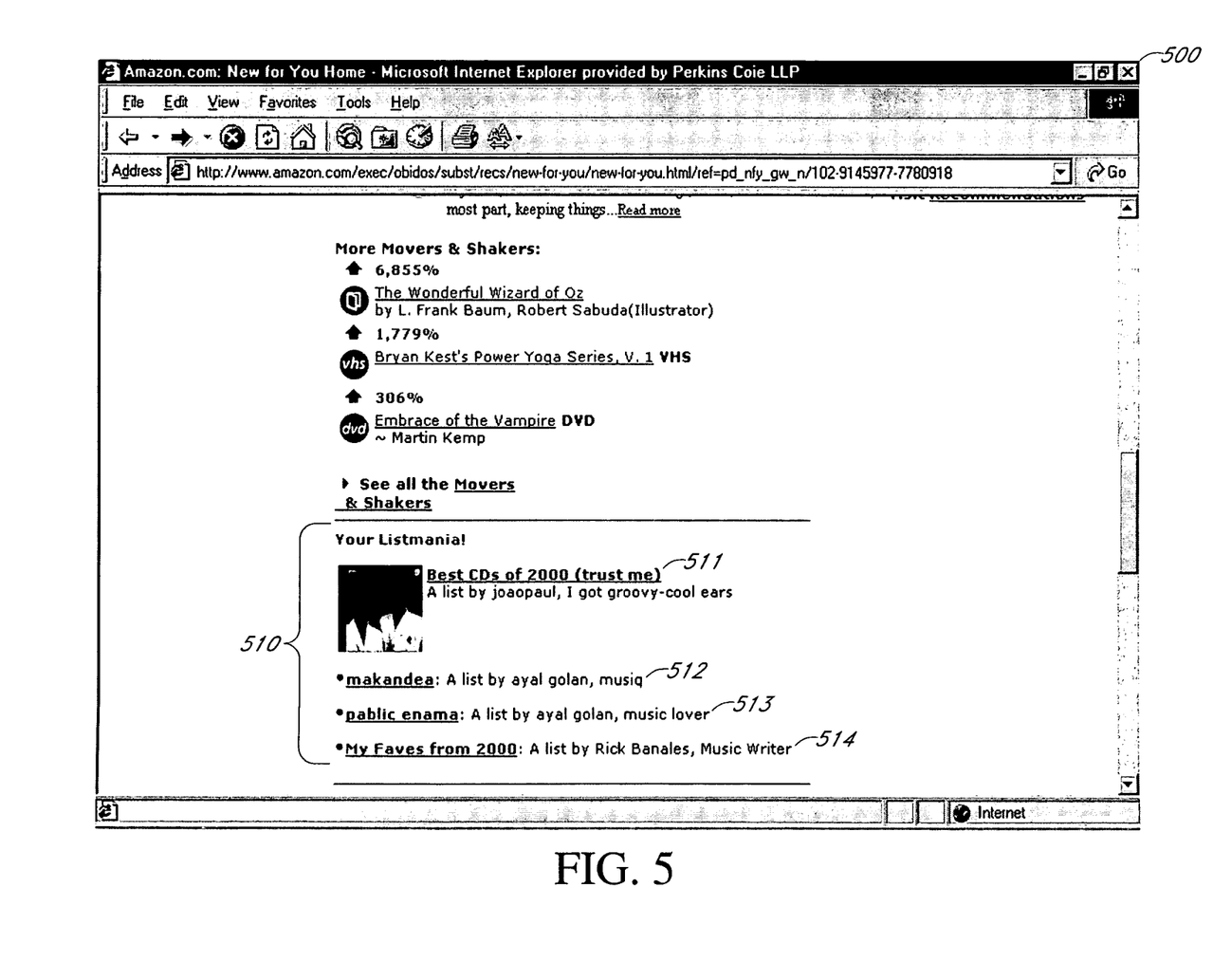
FIG. 5 is a display diagram showing a third page of a more extensive display.

FIG. 5 is a display diagram showing a third page of a more extensive display. Page 500 includes a section 510 showing information about themed new product lists 511-514 constructed by other users in which the user may be interested.

Figure 6:
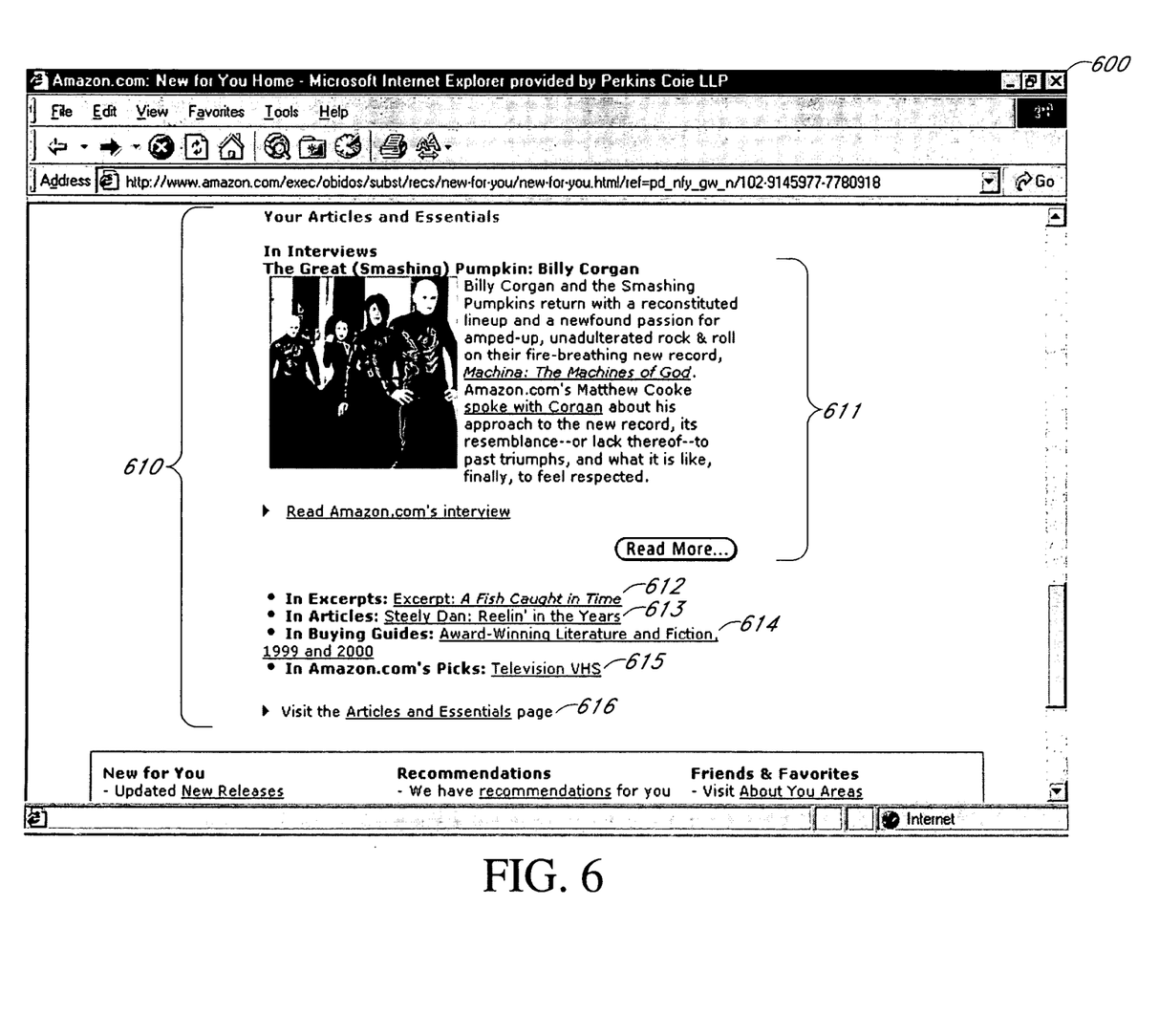
FIG. 6 shows a fourth page of the more extensive display.

FIG. 6 shows a fourth page of the more extensive display. Page 600 includes an articles section 610. The articles section includes information 611-616 about new articles and other new editorial content likely to be of interest to the user.

Figure 7:
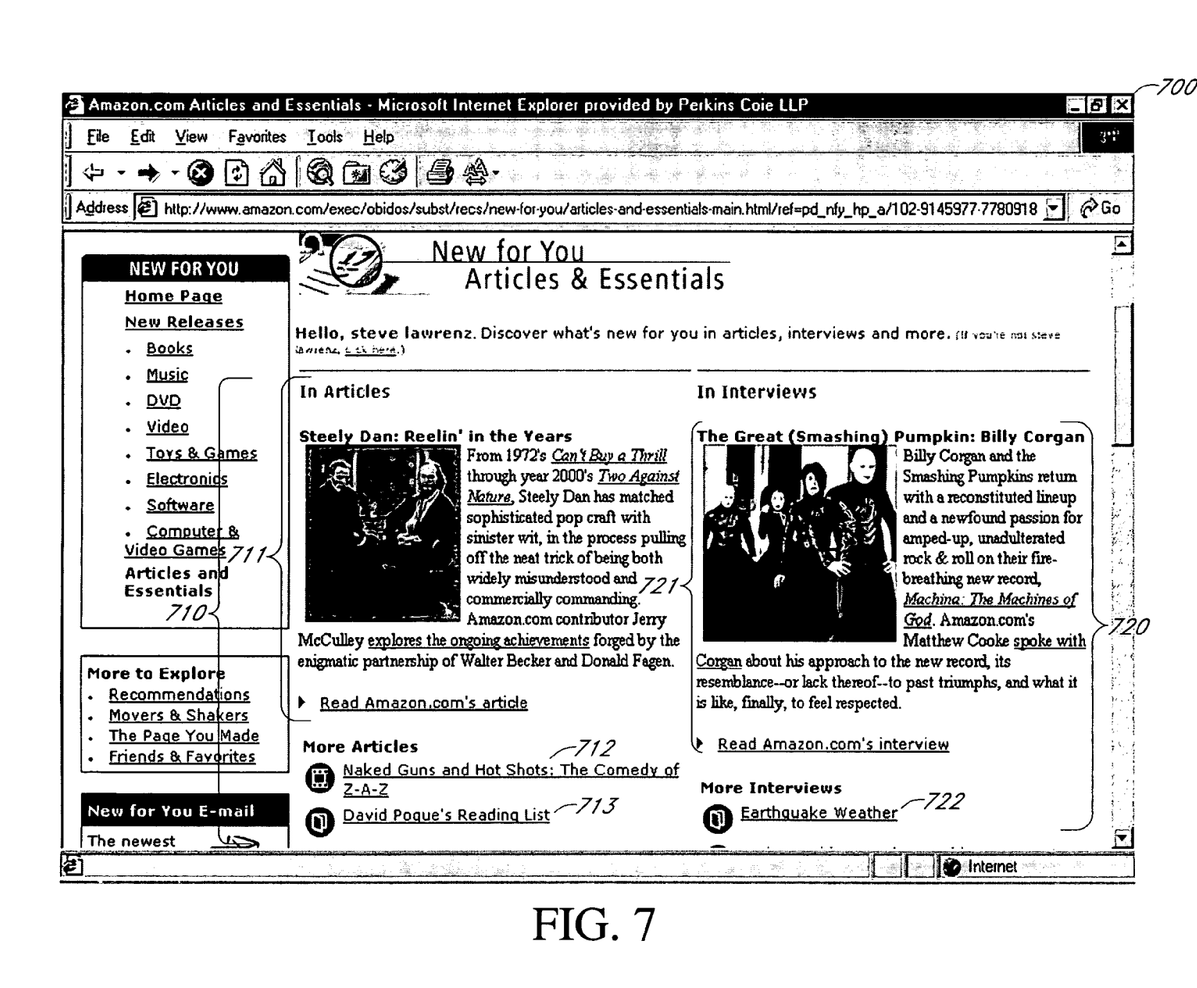
FIG. 7 is a display diagram showing a detailed display of information about new articles likely to be of interest to the user.

FIG. 7 is a display diagram showing a detailed display of information about new articles likely to be of interest to the user. Display 700 includes sections such as 710 about articles and section 720 about interviews. For example, section 710 contains information 711-713 about articles likely to be of interest to the user.

Figure 8:
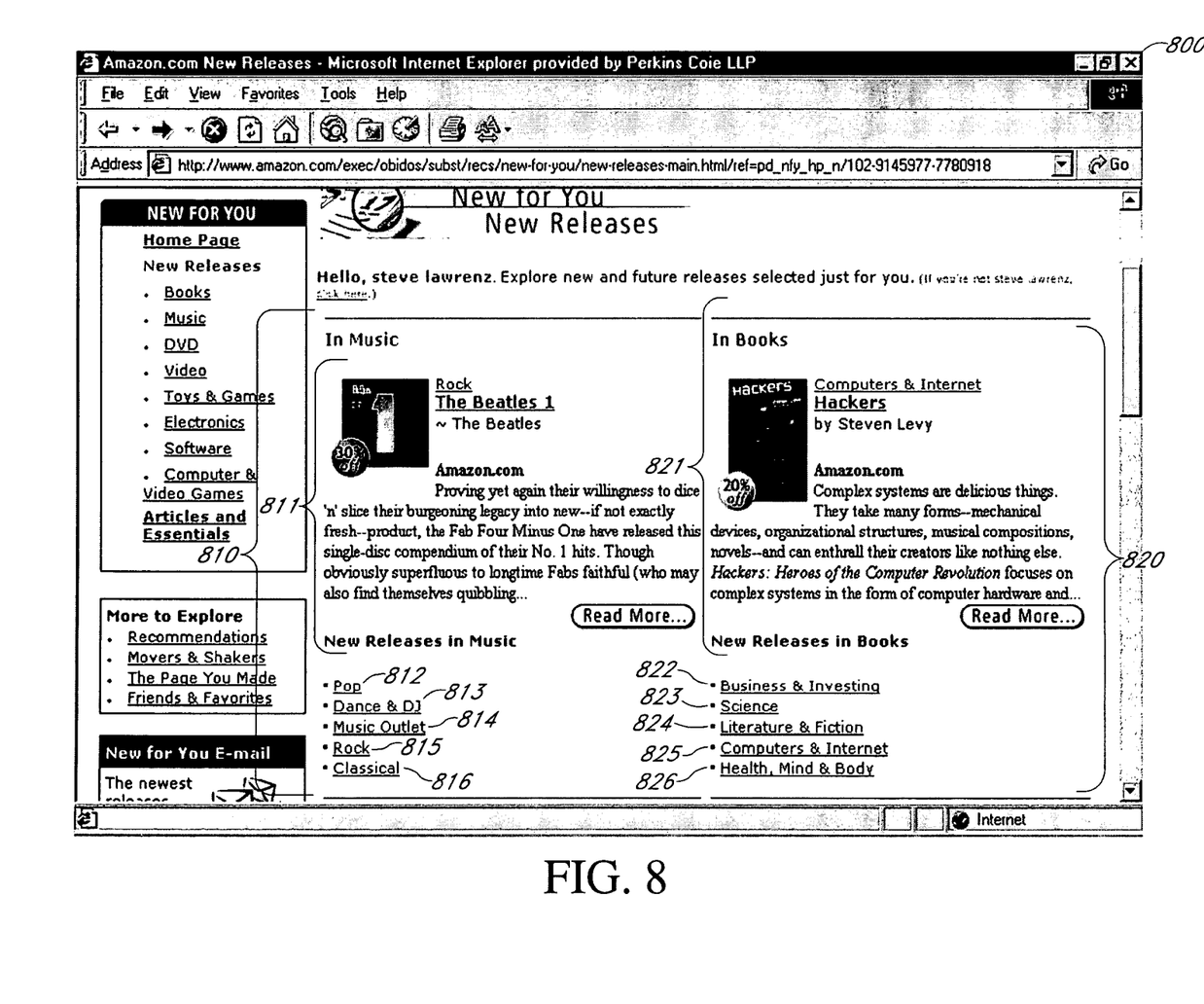
FIG. 8 is a display diagram showing a more extensive display of new products.

FIG. 8 is a display diagram showing a more extensive display of new products. In some embodiments, display 800 is displayed when the user clicks on a link such as the "More New Releases" link shown in FIG. 2. Display 800 contains sections for each of a number of categories of new products. For example, display 800 contains section 410 showing information about new products of interest to the user in a music category, while section 820 shows information about products of interest to the user in a books category. As an example, section 810 contains a subsection 811 containing information about one or more specific products in the category. Section 810 further contains links such as links 812-816 to subcategories of the music category that the user may click on in order to display new products of interest to the user in the subcategories. The selection and ordering of the categories, as well as the selection and ordering of the subcategories, is in some embodiments performed based upon indications of the user interest, such as past purchases, web browsing, etc.

Figure 9:
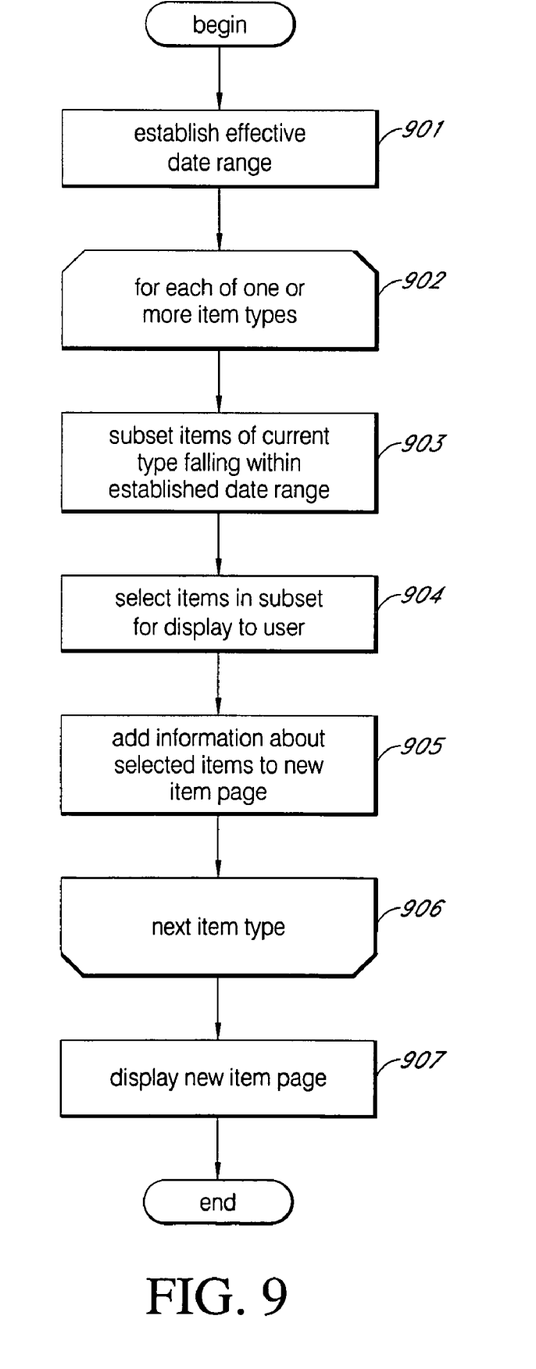
FIG. 9 is a display diagram showing steps to be performed by the facility in order to display information about new items likely to be of interest to a user.

FIG. 9 is a display diagram showing steps to be performed by the facility in order to display information about new items likely to be of interest to a user. While these steps are shown in a particular order, in some embodiments these steps are re-arranged, and some steps may be deleted, moved, added, subdivided, combined, subdivided and/or modified. Each of these steps may be implemented in a variety of different ways. Also, while these steps are shown as being performed in series, these steps may instead be performed in parallel, or may be performed at different times.

In step 901, the facility establishes an effective date range for items that will be considered new. In some embodiments, the beginning of the effective date range established in step 901 is a pre-determined amount of time before the current date, such as six weeks before the current date. In some embodiments, the effective date range established in step 901 begins on a date related to the date on which the user last visited the merchant web site, such as the date that the user last visited the merchant web site. In some embodiments, the end of the effective date range established in step 901 is a pre-determined period of time after the current date, such as three weeks after the current date. The effective date range may be established in step 901 in a variety of other ways as well.

In steps 902-906, the facility loops through each of one or more types of items. For example, item types may include products; articles, announcements, and other content; recommendations; Movers & Shakers; themed user product lists; etc. In step 903, the facility subsets the items of the current type down to those that fall within the date range established in step 901. That is, the facility filters out items of the current type whose effective date is outside the range established in step 901. Each item's effective date typically approximates the date on which item became available for purchase or consumption. For example, an item's effective date may be its release date, its publication date, its arrival date, its completion date, its receipt date or the date of some associated event, such as a holiday or anniversary.

In step 904, the facility selects items in the subset created in step 903 for display to the user. Such selection is typically performed in a manner that selects items in which the user is likely to be interested. This likelihood of user interest can be established based upon information indicating preferences for the individual user, such as information about past purchases or web browsing activity; information about preferences of a group that the user belongs to, such as a group corresponding to a geographic area, an Internet service provider or a special interest; or information indicating the preferences of all users, again including sales and browsing activity. Some embodiments utilize recommendation engines and associated techniques in step 904. In step 904, the facility may further sort the items of the current category in a way that reflects the likelihood that the user will be interested in the item.

In step 905, the facility adds information about the item selected in step 904 to a new item page such as those shown in FIGS. 2-8. For example, the facility may add information about the selected items to a new item web page.

In step 906, if additional item types remain, the facility continues in step 902 to process the next item type. Otherwise, the facility continues in step 907. In step 907 the facility displays the new item page. For example, the facility may provide the new item page to a web server, that in turn serves it to the web browser of the user. After step 907, these steps conclude.

In different embodiments of the facility, various permutations of the steps shown are utilized. For example, steps 903 and 904 may be reversed, so that items are selected based upon likely user interest before being subsetted based upon effective date. This could be especially effective if a mechanism already exists for selecting items likely to be of interest to a user, whose output can be subjected to the date filtering process. Further, while these steps are shown as being performed in response to each user request for new item information, any of these steps may be performed in advance, either for this individual user, groups of users, or the entire user population. Various other modifications to the steps shown are also contemplated.

It will be understood by those skilled in the art that the above-described facility could be adapted or extended in various ways. For example, the facility may be used by web sites other than those of web merchants and may be used by merchants in settings other than the web. The facility may be used to display information about items of virtually any type, using a wide variety of selection methods. Further, a variety of well-known implementation techniques may be substituted for those described herein. While the foregoing description makes reference to preferred embodiments, the scope of the invention is defined solely by the claims that follow and the elements recited therein.

We claim:

1. A computer-implemented method for presenting information about new items, comprising:
   under control of one or more configured computing systems,
   receiving a request for information submitted on behalf of an identified user;
   accessing a set of items having effective times associated with corresponding dates on which the items became available for purchase or consumption;
   performing a first filtering to eliminate items of the set whose effective times indicate that the items are not new;
   performing a second filtering to eliminate items of the set in which the user likely has a low level of interest; and
   subsequent to both the first and second filterings, presenting to the user information about each of at least a portion of the filtered items.

2. The computer-implemented method of claim 1 wherein the first filtering involves comparing the effective time of each item to a last visit time.

3. The computer-implemented method of claim 1 wherein the first filtering involves comparing the effective time of each item to an offset from the current time.

4. The computer-implemented method of claim 1 wherein the second filtering is performed using a recommendation engine.

5. The computer-implemented method of claim 4 wherein the second filtering is performed using a list of products, genres, authors, or other items generated by the recommendation engine using previous purchases, ratings, pages viewed, or other actions of a customer in comparison with other similar customers.

6. The computer-implemented method of claim 1 wherein the second filtering is performed using information associated with the user that reflects the user's interests.

7. The computer-implemented method of claim 1 wherein the second filtering is performed using information reflecting the interest of a user population including the user in items of the set.

8. The computer-implemented method of claim 1 wherein the second filtering is performed using information reflecting the interest of all users in items of the set.

9. The computer-implemented method of claim 1 wherein the second filtering is performed using information reflecting overall consumption of items of the set.

10. The computer-implemented method of claim 1 wherein the second filtering is performed based upon input from a human editor.

11. The computer-implemented method of claim 1 wherein the first filtering is performed prior to the second filtering.

12. The computer-implemented method of claim 1 wherein the second filtering is performed prior to the first filtering.

13. The computer-implemented method of claim 1 wherein the first filtering is performed prior to receiving the request.

14. The computer-implemented method of claim 1 wherein the first filtering is performed in response to receiving the request.

15. The computer-implemented method of claim 1 wherein the second filtering is performed prior to receiving the request.

16. The computer-implemented method of claim 1 wherein the second filtering is performed in response to receiving the request.

17. The computer-implemented method of claim 1 wherein the presenting includes displaying information about each of at least a portion of the filtered items.

18. The computer-implemented method of claim 1 wherein the presenting includes serving a web page containing information about each of at least a portion of the filtered items.

19. The computer-implemented method of claim 1 wherein the presenting includes transmitting a message containing information about each of at least a portion of the subsetted items.

20. The computer-implemented method of claim 19 wherein an electronic message is transmitted.

21. The computer-implemented method of claim 19 wherein a physical message is transmitted.

22. A computing system for presenting information about new items, comprising:
- a receiver that receives a request for information submitted on behalf of an identified user;
- one or more memories containing information about a set of items having effective times associated with corresponding dates on which the items became available for purchase or consumption;
- a first subsetting component for performing a first subsetting to eliminate items of the set whose effective times indicate that the items are not new;
- a second subsetting component for performing a second subsetting to eliminate items of the set in which the user likely has a low level of interest; and
- an information presentation subsystem that presents to the user information about each of at least a portion of the items subsetted by both the first and second subsetting components.

23. The computing system of claim 22, wherein the first subsetting component performs the first subsetting by comparing the effective time of each item of the set to a last visit time of the identified user.

24. The computing system of claim 22, wherein the second subsetting component performs the second subsetting using information associated with the identified user that reflects the interests of the identified user.

25. The computing system of claim 22, wherein the second subsetting component performs the second subsetting using information reflecting the interest of a user population in items of the set, wherein the user population includes the identified user.

* * * * *